United States Patent
Zommer (10) Patent No.: US 8,347,120 B2
(45) Date of Patent: Jan. 1, 2013

(54) SYSTEM AND METHOD FOR CONSERVING POWER APPLIED TO AN ELECTRICAL APPARATUS

(75) Inventor: Nathan Zommer, Fort Lauderdale, FL (US)

(73) Assignee: IXYS Corporation, Milpitas, CA (US)

( * ) Notice: Subject to any disclaimer, the term of this patent is extended or adjusted under 35 U.S.C. 154(b) by 556 days.

(21) Appl. No.: 12/540,291

(22) Filed: Aug. 12, 2009

(65) Prior Publication Data

US 2010/0042857 A1    Feb. 18, 2010

Related U.S. Application Data

(60) Provisional application No. 61/088,322, filed on Aug. 12, 2008.

(51) Int. Cl.
*G06F 1/00* (2006.01)
*G06F 1/26* (2006.01)
*G06F 1/32* (2006.01)

(52) U.S. Cl. ......................................... 713/300; 713/320

(58) Field of Classification Search .................. 713/300, 713/320
See application file for complete search history.

(56) References Cited

U.S. PATENT DOCUMENTS

| | | | | |
|---|---|---|---|---|
| 5,345,376 A * | 9/1994 | Nourbakhsh | ..................... | 363/62 |
| 5,544,138 A * | 8/1996 | Bajorek et al. | ............. | 369/53.42 |
| 5,657,211 A * | 8/1997 | Brockmann | ..................... | 363/16 |
| 5,781,783 A * | 7/1998 | Gunther et al. | ............... | 713/320 |
| 5,905,901 A * | 5/1999 | Klein | ............................. | 713/324 |
| 5,954,820 A * | 9/1999 | Hetzler | ........................ | 713/323 |
| 5,963,024 A * | 10/1999 | Doemen | ........................ | 323/282 |
| 5,995,384 A | 11/1999 | Majid et al. | | |
| 6,266,776 B1 * | 7/2001 | Sakai | ............................. | 713/300 |
| 6,583,521 B1 * | 6/2003 | Lagod et al. | ..................... | 307/70 |
| 6,748,545 B1 * | 6/2004 | Helms | ............................. | 713/300 |
| 6,885,115 B2 | 4/2005 | Hatori et al. | | |
| 6,885,974 B2 * | 4/2005 | Holle | ............................. | 702/182 |
| 6,892,313 B1 * | 5/2005 | Codilian et al. | .............. | 713/323 |
| 7,325,050 B2 * | 1/2008 | O'Connor et al. | .............. | 709/223 |
| 2003/0056125 A1 * | 3/2003 | O'Conner et al. | ............ | 713/300 |
| 2003/0145242 A1 * | 7/2003 | Derocher et al. | ............. | 713/320 |
| 2004/0189271 A1 * | 9/2004 | Hansson et al. | .............. | 323/283 |
| 2004/0221185 A1 * | 11/2004 | Bose et al. | ..................... | 713/300 |
| 2005/0044436 A1 * | 2/2005 | Holle | ............................. | 713/320 |
| 2006/0019723 A1 | 1/2006 | Vorenkamp et al. | | |
| 2007/0220292 A1 | 9/2007 | Ishihara et al. | | |
| 2008/0072090 A1 * | 3/2008 | O'Connor et al. | ............ | 713/330 |
| 2011/0234123 A1 * | 9/2011 | Myers et al. | .................. | 315/307 |

* cited by examiner

*Primary Examiner* — Mark Connolly
(74) *Attorney, Agent, or Firm* — Kilpatrick Townsend & Stockton LLP (57) ABSTRACT

A usage pattern identifies time periods when an electrical apparatus is likely to be powered-up or not in use. Power provided to an electrical apparatus is increased during time periods that the electrical apparatus is likely to be powered-up. Similarly, the power provided to the electrical apparatus is reduced or removed during time periods that the electrical apparatus is likely to be out of use or idle. The usage pattern is continually updated and refined by collecting usage data during user interaction with the electrical apparatus.

18 Claims, 6 Drawing Sheets

SYSTEM AND METHOD FOR CONSERVING POWER APPLIED TO AN ELECTRICAL APPARATUS

CROSS-REFERENCE TO RELATED APPLICATIONS

This application claims priority to U.S. Provisional Patent Application No. 61/088,322, filed on Aug. 12, 2008, which is incorporated herein for all purposes.

TECHNICAL FIELD

Embodiments of the invention are directed to energy conservation and, more particularly, to a system and a method for adjusting power that is provided to an electrically-powered apparatus based on a usage pattern that identifies time periods when the apparatus is likely to be used or left idle.

BACKGROUND

An electronic computing system that includes one or more central processing units (CPUs), micro-controllers or digital control systems has a power electrical efficiency above 60% at full load when operated at or within full capacity. When the system is idle, in between tasks, or operating at much less than full load (e.g., at 25% of full load), efficiency drops to below 20%. At a power electrical efficiency of 20%, for each ten watts of power the system requires to perform a task, forty watts is wasted. In addition, the system may consume thirty-five watts of power when idle, i.e., while performing no tasks. As electricity resources are becoming increasingly limited and costly, it is important to improve the energy consumption efficiency of computing systems, not only during full load operation, but also to improve efficiency at less than full load, especially when the system is left idle for an extended period of time (e.g., for five minutes, multiple hours or even days).

With the popularity of personal computers, the amount of electrical power that is wasted reaches millions to possibly billions of watts worldwide when computing systems are idling between periods of use. For example, a user may not turn off the power to his computer even when the computer is not in use because the user may not want to wait for the computer to reboot after the computer is turned on. In other words, most users would rather leave their computers on to avoid the time delay for the reboot process than conserve electricity. The same issue applies to other computing devices, appliances and consumer products that include microcontrollers or CPUs.

Therefore, it is desirable to reduce or completely remove power that is provided to an electrically-powered apparatus when the apparatus is not in full use or is left idling for an extended period of time. It is also desirable to anticipate when a user is likely to operate the apparatus such that the apparatus may be ready for immediate user interaction without any delay caused by powering-up the apparatus.

SUMMARY

The present invention is directed to a method and system for conserving power applied to an electrical apparatus. The power provided to the electrical apparatus is increased when a usage pattern identifies a time period that the electrical apparatus is likely to be powered-up such that a user may avoid any delay in starting the electrical apparatus. Similarly, the power provided to the electrical apparatus is reduced or removed when the usage pattern identifies a time period that the electrical apparatus is likely to be out of use such that energy may be conserved. The usage pattern is updated and refined after repeated user interaction with the electrical apparatus and is stored in non-volatile memory. Example data that is stored in the usage pattern associated with a computing device includes a time that the computing device is turned on, a time duration that the user continuously interacts with the computing device, and a time that the computing device is turned off. Other data may also be stored in the usage pattern to restore the apparatus to a previous operational state before power was removed.

Some embodiments of the present invention are directed to a system for adjusting power applied to an electrical apparatus. The system includes an input power control unit coupled to a power source, a power supply coupled to the input power control unit, and an electrical apparatus communicatively coupled to the power supply and the input power control unit. The electrical apparatus is configured to generate a usage pattern that identifies time periods when the electrical apparatus is likely to consume high levels of power and low levels of power. Power supplied to the electrical apparatus by the power supply is reduced by the input power control unit during a time period identified by the usage pattern when the electrical apparatus is likely to consume low levels of power. Power supplied to the electrical apparatus by the power supply is increased by the input power control unit during a time period identified by the usage pattern when the electrical apparatus is likely to consume high levels of power.

Some embodiments of the present invention are directed to a method for adjusting power applied to an electrical apparatus. The method includes collecting usage data based on user interaction with an electrical apparatus. A usage pattern generated based on the collected usage data identifies time periods when the electrical apparatus is likely to consume high levels of power and low levels of power. A signal is transmitted that identifies a time period identified by the usage pattern when the electrical apparatus is likely to consume low levels of power and/or a time period identified by the usage pattern when the electrical apparatus is likely to consume high levels of power. Reduced power is received at the electrical apparatus during the time period when the electrical apparatus is likely to consume low levels of power. Increased power is received at the electrical apparatus during the time period when the electrical apparatus is likely to consume high levels of power.

A further understanding of the nature and advantages of the present invention may be realized by reference to the remaining portions of the specification and the drawings.

DETAILED DESCRIPTION

Embodiments of the invention are directed to a system and a method for conserving energy. Power that is provided to an electrically powered apparatus or to a portion of the apparatus may be reduced when the apparatus is likely not to be in full use based on a usage pattern of the apparatus. Power may be entirely removed when the apparatus is left idling for an extended period of time. In addition, power that is provided to the apparatus or to a portion of the apparatus may be increased when the apparatus is likely to consume more power based on the usage pattern. The usage pattern of the apparatus is continually updated and refined based on repeated user interaction with the apparatus to identify time periods during which the power provided to the apparatus should be reduced or increased to conserve electricity.

In one embodiment, the electrically powered apparatus includes non-volatile memory. The apparatus includes an internal clock that monitors real time, namely, the current time of day and the current date. When power provided to the apparatus is removed, data associated with activities performed by the apparatus during the previous user session may be stored in the non-volatile memory. For example, the apparatus may be a personal computer, and the data stored in the non-volatile memory may include a software program launched during the previous user session; a web page, file or document frequently retrieved by the user; a specific website commonly accessed by the user; or any other data related to status and usage, including the date and the time of day just before power was removed from the apparatus. When power is reapplied to the apparatus, the apparatus may be restored to the previous operational state before power was removed using data retrieved from the non-volatile memory.

When the computing device is powered-up again, the system hard drive is activated, and the computing device resumes full operation seamlessly without user intervention and without the boot-up delay of prior art systems. By storing usage data in the non-volatile memory such as data related to specific software programs, mode of use, network connectivity and access time, the computing device may be instantly powered up. For example, as soon as a user interacts with a personal computer by, e.g., activating a power switch, touching a display screen, moving a mouse, or depressing keys on a keyboard, power is immediately applied to the apparatus.

The usage pattern associated with the computing device may be used to anticipate when a user is likely to access the device. The usage pattern is stored in the non-volatile memory and repeatedly updated and refined as the user interacts with the computing device. Example usage data that is stored in the usage pattern includes a time that the computing device is turned on, a time duration that the user continuously interacts with the computing device, and a time that the computing device is turned off. Since the computing device keeps track of usage data in real time, the device may determine when user interaction is most likely to occur or not occur. This energy conserving concept may apply to any electric apparatus that is used frequently and should be turned off when not in use to avoid wasting electricity.

Figure 1:
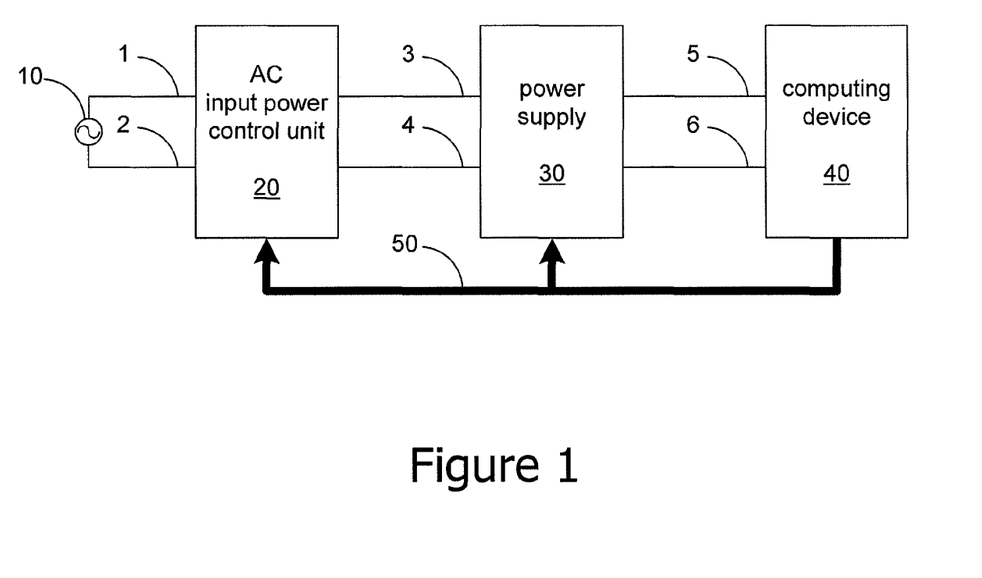
FIG. 1 is a block diagram illustrating a system for adjusting power applied to an electrical apparatus.

FIG. 1 is a block diagram illustrating a system for adjusting power applied to an electrical apparatus in accordance with embodiments of the invention. The system includes an AC power source 10, an AC input power control unit 20, a power supply 30, and an electrical apparatus which is shown in the drawings as a computing device 40. The electrical apparatus may be any device that is powered using electrical energy such as a server, a personal computer, a kitchen appliance, a consumer electronic device, or any other electronic device as is known in the art. The AC power source 10 is coupled to the AC input power control unit 20 by lines 1, 2. The AC input power control unit 20 is coupled to the power supply 30 by lines 3, 4. The power supply 30 is coupled to the computing device 40 by lines 5, 6. A power management bus (PMB) 50 communicatively couples the computing device 40 to the AC input power control unit 20 and to the power supply 30.

The AC input power control unit 20 and the power supply 30 are shown separately to highlight the function of the AC input power control unit 20. However, in some embodiments, the AC input power control unit 20 may be incorporated into the power supply 30.

Energy management software may be provided in the computing device 40 to implement some embodiments of the invention. In addition, in some embodiments, hardware of the computing device 40 may be activated by the energy management software to increase or reduce power applied to the computing device 40. The computing device 40 issues energy management signals to the PMB 50 based on the usage pattern associated with the computing device 40 to identify the level of power required for efficient operation. The AC input power control unit 20 and the power supply 30 receive and recognize the energy management signals, and act accordingly to reduce or increase the power provided to the computing device 40.

If the computing device 40 determines that no power should be applied based on the usage pattern, an appropriate energy management command is issued from the computing device 40 to the PMB 50 such that both the AC input power control unit 20 and the power supply 30 are turned off. In some embodiments, the computing device 40 may issue a signal via the PMB 50 to turn off only the AC input power control unit 20 but maintain the power supply 30 at a powered-on state. In the power-off mode, the computing device 40 may either turn itself off or place itself in a standby mode. In the standby mode, the computing device 40 may issue a signal to the AC input power control unit 20 via the PMB 50 to provide enough power to the power supply 30 to maintain basic timing and monitoring functions of the computing device 40. In the standby mode, the computing device 40 may use less than 1% of the full rated power of the computing device 40. When the computing device 40 requires full power, the computing device 40 sends a power-up energy management signal to the AC input power control unit 20 and the power supply 30 via the PMB 50. The computing device 40 is then turned on and is ready to respond to user interaction.

In some embodiments, the computing device 40 recognizes whether commands received via user input require the full power of the power supply 30. Thus, in some embodiments, the computing device 40 may issue energy management signals on the PMB 50 to control the AC input power control unit 20 to provide the necessary amount of power from the AC power source 10 to the power supply 30 and the computing device 40.

In some embodiments, the energy management signals are transmitted from the computing device 40 to the AC input power control unit 20 and the power supply 30 via a wireless communication method. For example, the computing device 40 may send the energy management signals as infrared, optical or radio frequency signals. To support wireless communication, the computing device 40 is provided with an appropriate transmitter, and the AC input power control unit 20 and the power supply 30 are provided with corresponding receivers. Given that the distance between the components is typically less than two feet, wireless communication between the components can be achieved at a low cost.

Figure 2:
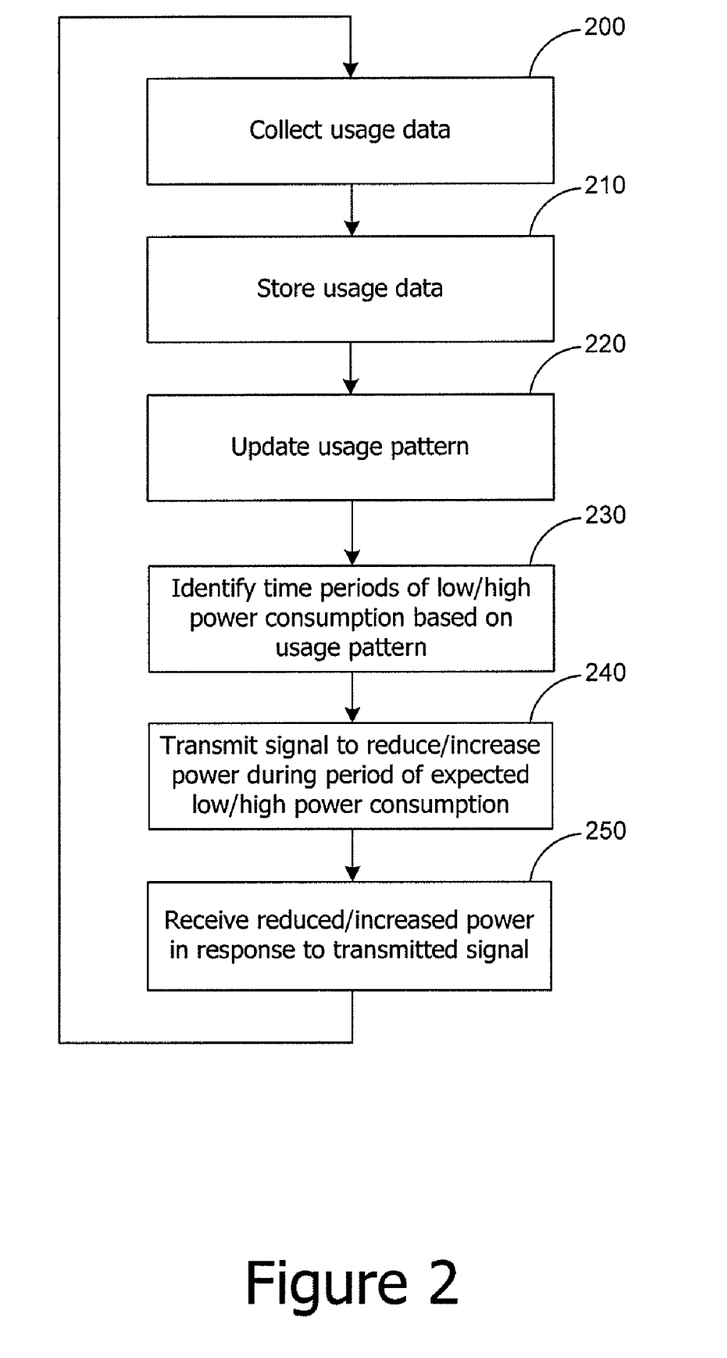
FIG. 2 is a flow diagram illustrating a method performed by an electrical apparatus for conserving power.

FIG. 2 is a flow diagram illustrating a method performed by an electrical apparatus for conserving power. As the electrical apparatus is used, usage data associated the electrical apparatus is continually collected (step 200). The usage data identifies the status and usage of the apparatus when certain activities are performed during a user session. An example of usage data includes a time stamp that identifies when the apparatus is turned on and off, and a time duration that a user continuously interacts with the apparatus during the session. In the event that the apparatus is a personal computer, other examples of usage data may include a specific software program that is frequently executed on the personal computer; and a web site, web page, file or document that is frequently accessed.

The collected usage data for each user session is stored in non-volatile memory (step 210). The non-volatile memory may be a flash memory, a ferromagnetic chip, or any other form of non-volatile memory known to those having ordinary skill in the art. When the apparatus is powered-up, the usage data is retrieved from the non-volatile memory to restore the electrical apparatus to a previous operational state before power was removed. For example, a computing device may launch a software program or display a web page that was active during a previous user session before power was removed from the computing device.

A usage pattern of the electrical apparatus is updated as the usage data for each session is collected (step 220). As additional usage data is accumulated and stored, the usage pattern becomes more refined to identify specific usage characteristics and operational states of the electrical apparatus. For example, the usage pattern may be used to identify when a user is most likely or least likely to power-up or interact with the electrical apparatus. Similarly, the usage pattern may be used to identify a most recent operational state of the apparatus before power was removed to end the previous user session of the apparatus.

As the usage pattern becomes more refined as additional usage data is collected, the usage pattern is used to identify time periods that the electrical apparatus is most likely or least likely to require power (step 230). In one example where the electrical apparatus is a computing device, a determination may be made based on the usage pattern that the user has never accessed the computing device between 1:00 AM and 4:00 AM on a Sunday morning such that the computing device should most likely be turned off or be provided with a minimum amount of power. Similarly, the usage pattern of the computing device may be used to determine that the user frequently accesses the computing device on a Monday at approximately 8:00 AM to browse the Internet for thirty minutes.

After the electrical apparatus identifies time periods during which the apparatus is likely to consume the least/most power based on the usage pattern, the apparatus generates an energy management signal and transmits the signal to the AC input power control unit and the power supply via the power management bus (step 240). The energy management signal identifies the time periods during which the apparatus is likely to consume the least/most power based on the usage pattern. For example, the signal may identify the time period between 1:00 AM and 4:00 AM on a Sunday morning as the period during which the electrical apparatus requires little or no power. Similarly, the signal may identify the time period between 8:00 AM and 8:30 AM on a Monday morning as the period during which the electrical apparatus should be powered-up in anticipation of user interaction.

The power provided to the electrical apparatus is then reduced or increased based on the transmitted signal (step 250). For example, when the electrical apparatus is a computing device that was left powered-up at 1:00 AM on Sunday, the computing device will be turned off by the operation of the AC input power control unit and the power supply. Similarly, when 8:00 AM on a Monday approaches and the computing device is not powered up, the computing device will be turned on at, for example, 7:50 AM, in response to the operation of the AC input power control unit and the power supply. In some embodiments, the computing device may also launch an application that is most likely to be accessed by the user (e.g., an Internet browser) based on the usage pattern such that the application is ready for user interaction.

After the power supplied to the electrical apparatus is adjusted in response to the energy management signal transmitted from the electrical apparatus, processing may return to step 200 where usage data is continually collected at the computing device to update and further refine the usage pattern. The continually updated and refined usage pattern is used to identify more precisely the time periods during which the computing device consumes high and low levels of power.

Figure 3:
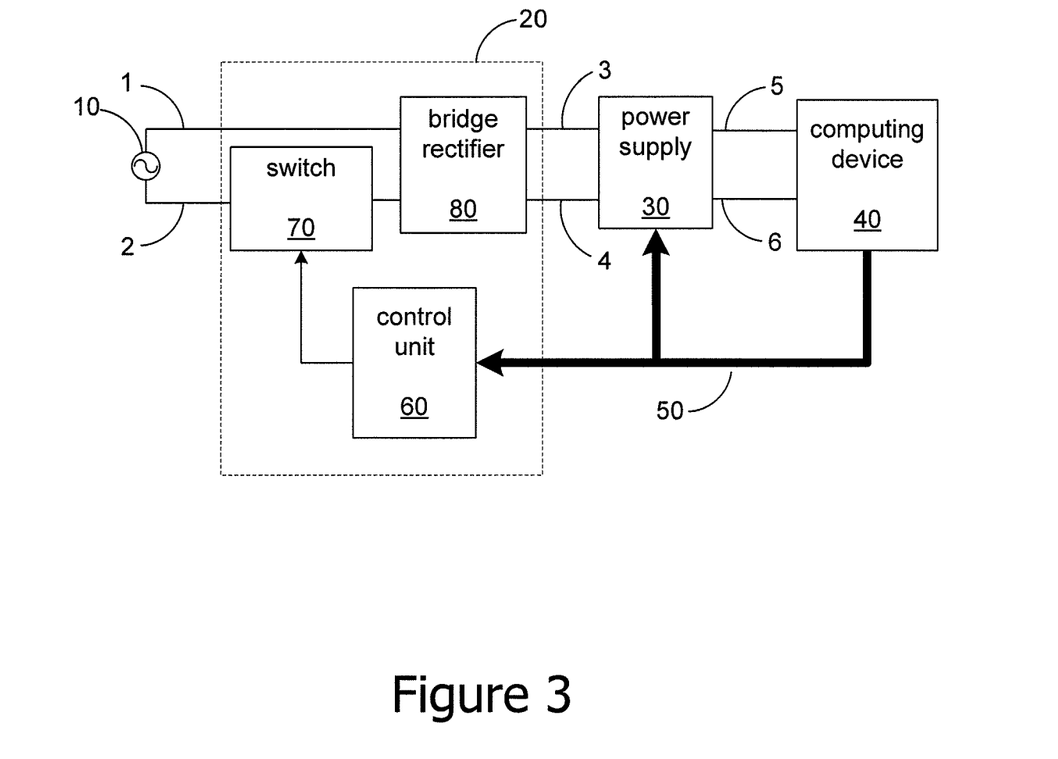
FIGS. 3-5 are block diagrams illustrating a system for adjusting power applied to an electrical apparatus.

FIG. 3 is a block diagram illustrating a system for adjusting power applied to an electrical apparatus in accordance with embodiments of the invention. The system shown in FIG. 3 is similar to the system shown in FIG. 1, however the AC input power control unit 20 is shown in more detail. The AC input power control unit 20 includes a control unit 60, a switch 70 and a bridge rectifier 80.

The AC power source 10 is coupled to the bridge rectifier 80 via line 1, and to the switch 70 via line 2. The switch 70 is also coupled to the bridge rectifier 80 and the control unit 60. The bridge rectifier 80 is coupled to the power supply 30 via lines 3, 4. The power supply 30 is coupled to the computing device 40 via lines 5, 6. The computing device 40 is communicatively coupled to the power supply 30 and the control unit 60 via the PMB 50.

The computing device 40 generates energy management signals based on the power level required by the computing device 40 as determined by the usage pattern. The energy management signals are provided to the PMB 50. The control unit 60 receives the energy management signals from the PMB 40 and controls the duty cycle of the switch 70 in response to the received signals. The switch 70 determines the amount of AC power that is provided to the bridge rectifier 80. The bridge rectifier 80 converts the received AC power to a DC level, and provides the DC power to the power supply 30 via lines 3, 4. The power supply 30 then provides the DC power to the computing device 40 via lines 5, 6. As more usage data is collected at the computing device 40 and the usage pattern becomes more refined, the control loop repeats to continually adjust the amount of power that is provided to the computing device 40. As a result, power provided to the computing device 40 is reduced during a time period of expected low power consumption and is increased during a time period of expected high power consumption.

Figure 4:
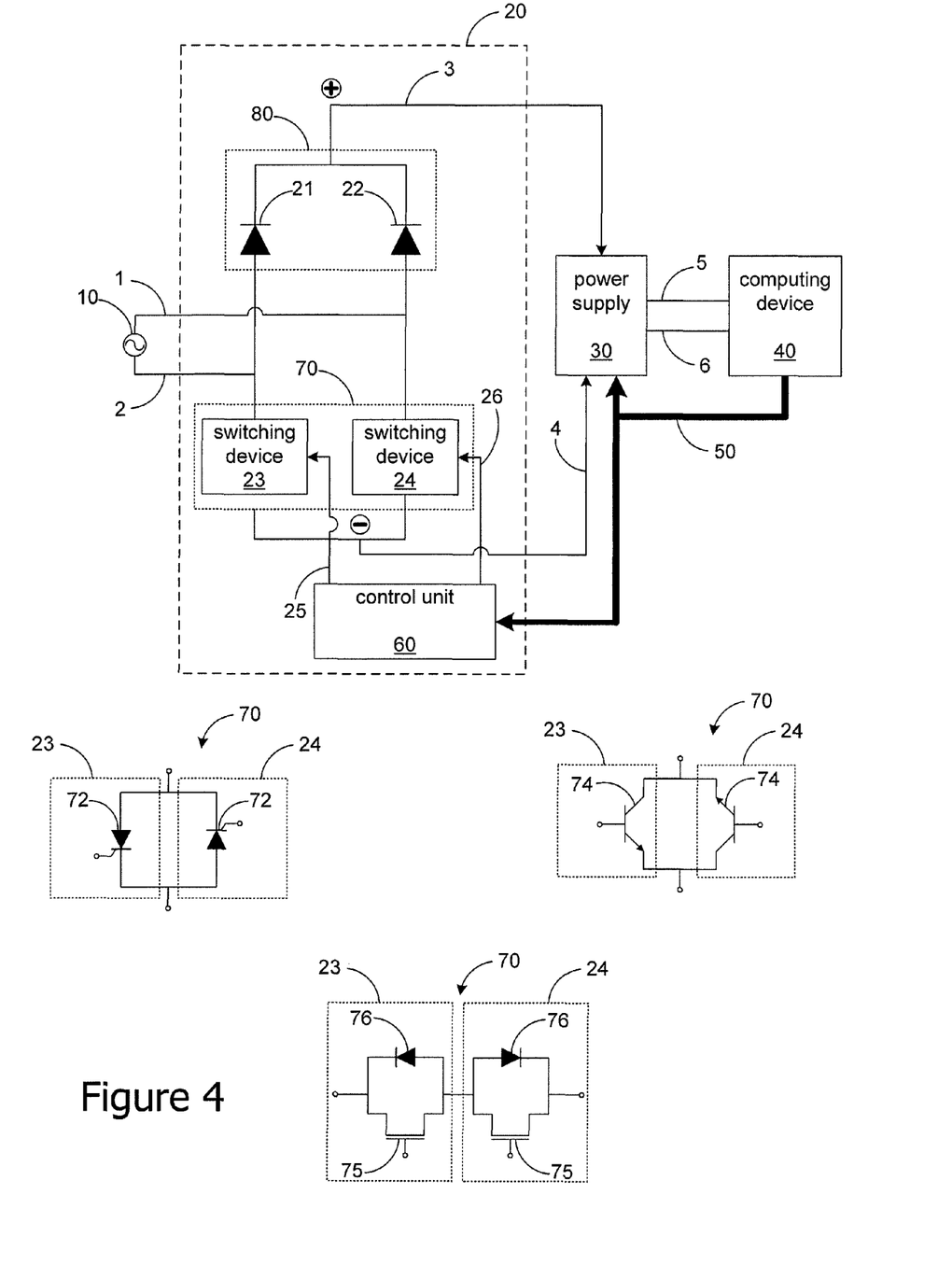

FIG. 4 is a block diagram illustrating a system for adjusting power applied to an electrical apparatus in accordance with embodiments of the invention. The system shown in FIG. 4 is similar to the system shown in FIG. 3, but FIG. 4 shows the AC input power control unit 20 in more detail. Specifically, the AC input power unit 20 of FIG. 4 shows that the bridge rectifier 80 includes rectifier diodes 21, 22 and that the switch 70 includes switching devices 23, 24. The switching devices 23, 24 and the rectifier diodes 21, 22 together form a controlled bridge.

In some embodiments the switching devices 23, 24 may each be a single transistor (e.g., a field effect transistor (FET), a reverse blocking insulated gate bipolar transistor (IGBT) or a bipolar transistor), or a silicon controller rectifier (SCR). As shown in FIG. 4, examples of the switch 70 may include two anti-parallel SCRs 72 provided back to back, two anti-parallel reverse blocking IGBTs 74, and two series MOSFETs 75 with two anti-parallel diodes 76. In other examples, the switch 70 may include two anti-parallel gate turn-off thyristors (GTOs), or two series IGBTs with two anti-parallel diodes.

As shown in FIG. 4, the AC power source 10 is coupled to the anode of the rectifier diode 21 by line 1 and is coupled to the anode of rectifier diode 22 by line 2. The anode of the rectifier diode 21 is coupled to the switching device 23, and the anode of the rectifier diode 22 is coupled to the switching device 24. The cathodes of the rectifier diodes 21, 22 are coupled to each other and to the power supply 30 via line 3. The switching devices 23, 24 are each coupled to the power supply 30 via line 4. The control unit 60 is coupled to the switching device 23 via line 25 and to the switching device 24 via line 26.

The computing device 40 transmits an energy management signal via PMB 50 to adjust the amount of input power provided thereto and the energy management signal is provided to the control unit 60. The control unit 60 routes the energy management signal via lines 25, 26 to the switching devices 23, 24. The energy management signal determines the duty cycle of the switching devices 23, 24 to control the amount of AC power that is provided to the rectifier diodes 21, 22. The rectifier diodes 21, 22 convert the received AC power to a DC level. The DC power is then provided to the power supply 30 via lines 3, 4 due to the cooperation between the rectifier diodes 21, 22 and the switching devices 23, 24. The power supply 30 then provides the DC power to the computing device 40 via lines 5, 6. As more usage data is collected by the computing device 40 and the usage pattern becomes more refined, the control loop repeats to continually adjust the amount of power that is provided to the computing device 40. As a result, power provided to the computing device 40 is reduced during a time period of expected low power consumption and is increased during a time period of expected high power consumption.

Figure 5:
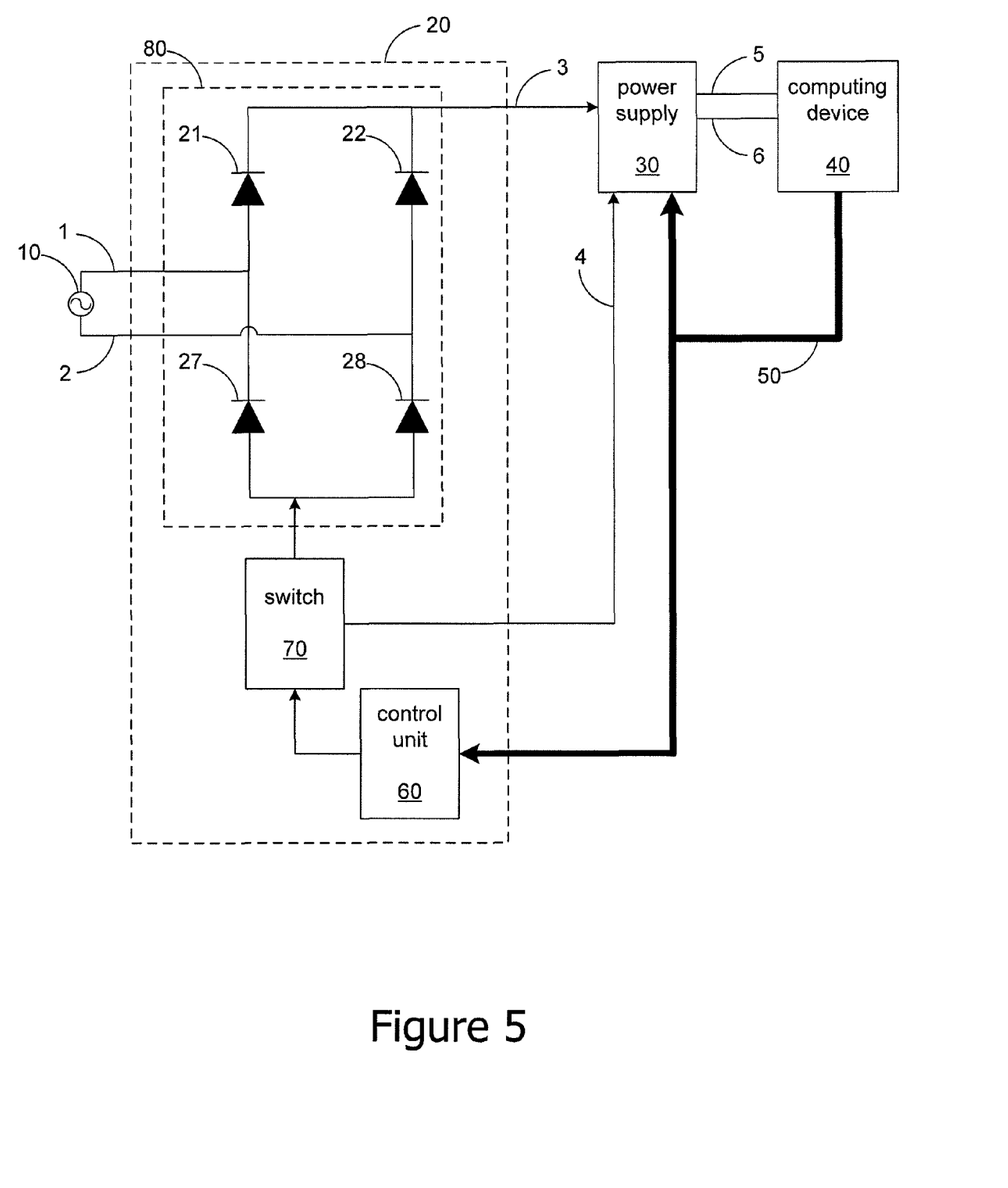

FIG. 5 is a block diagram illustrating a system for adjusting power applied to an electrical apparatus in accordance with embodiments of the invention. The system shown in FIG. 5 is similar to the system shown in FIG. 4. However, in this embodiment, the bridge rectifier 80 includes two rectifier diodes 27, 28 in addition to the two rectifier diodes 21, 22 as shown in FIG. 4.

The cathodes of the rectifier diodes 21, 22 are coupled to the power supply 30 via line 3. The anode of the rectifier diode 21 is coupled to the AC power source 10 via line 1 and to the cathode of the rectifier diode 27. The anode of the rectifier diode 22 is coupled to the AC power source 10 via line 2 and to the cathode of the rectifier diode 28. The anodes of the rectifier diodes 27, 28 are coupled to the switch 70.

As discussed above, the computing device 40 generates energy management signals based on the power level required by the computing device 40 as determined by the usage pattern. The energy management signals are provided to the PMB 50. The control unit 60 receives the energy management signals from the PMB 40 and controls the duty cycle of the switch 70 based on the received signals. The switch 70 determines the amount of AC power that is provided to the bridge rectifier 80. The bridge rectifier 80 converts the AC power received from the AC power source 10 to a DC level, and provides the DC power to the power supply 30 via lines 3, 4. The power supply 30 then provides the DC power to the computing device 40 via lines 5, 6.

As additional usage data is collected by the computing device 40 and the usage pattern becomes more refined, the control loop repeats to continually adjust the amount of power that is provided to the computing device 40. As a result, power provided to the computing device 40 is reduced during a time period of expected low power consumption and is increased during a time period of expected high power consumption.

Figure 6:
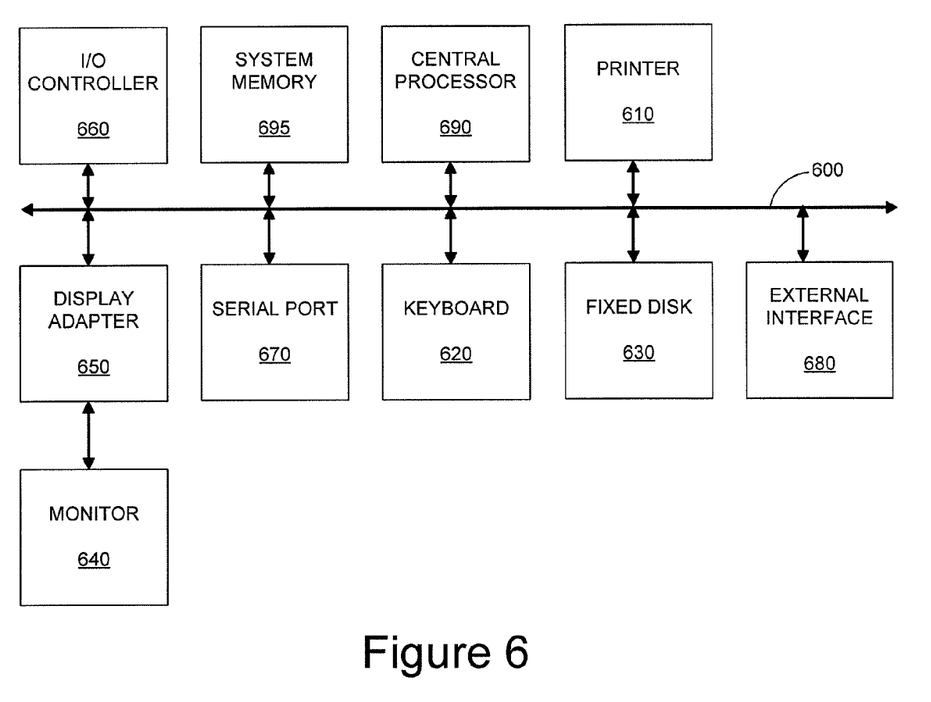
FIG. 6 is a block diagram illustrating typical components or subsystems of a computer apparatus that may be used in some embodiments of the present invention.

FIG. 6 is a block diagram illustrating typical components or subsystems of a computer apparatus that may be used in some embodiments of the present invention. Such components or any subset of such components may be present in various components shown in the Figures including the computing device 40. The subsystems shown in FIG. 6 are interconnected via a system bus 600. Additional subsystems such as a printer 610, keyboard 620, fixed disk 630, monitor 640, which is coupled to display adapter 650, and others are shown. Peripherals and input/output (I/O) devices, which couple to I/O controller 660, can be connected to the computer system by any number of means known in the art, such as serial port 670. For example, serial port 670 or external interface 680 can be used to connect the computer apparatus to a wide area network such as the Internet, a mouse input device, or a scanner. The interconnection via system bus 600 allows the central processor 690 to communicate with each subsystem and to control the execution of instructions from system memory 695 or the fixed disk 630, as well as the exchange of information between subsystems. The system memory 695 and/or the fixed disk 630 may embody a computer readable medium.

As disclosed above, power provided to an electrical apparatus is increased when a usage pattern identifies a time period that the electrical apparatus is likely to be powered-up such that a user may avoid any delay in starting the electrical apparatus. Similarly, the power provided to the electrical apparatus is reduced or removed when the usage pattern identifies a time period that the electrical apparatus is likely to be out of use or idle such that energy may be conserved. The usage pattern is refined as the user interacts with the electrical apparatus to continually adjust the amount of power that is provided to the electrical apparatus.

While the invention has been particularly shown and described with reference to specific embodiments, it will be understood by those skilled in the art that the foregoing and other changes in the form and details may be made therein without departing from the spirit or scope of the invention. Therefore, the scope of this invention should not be limited to the embodiments described above, and should instead be defined by the following claims.

What is claimed is:

1. An input power unit for controlling power supplied to an electrical apparatus which is coupled to a direct current power supply, the input power unit comprising:
   input terminals adapted to be connected to a source of alternating current;
   a switch coupled to the input terminals;
   a control unit connected to provide control signals to the switch;
   a rectifier connected to the switch;
   a power management bus coupled to the control unit, the direct current power supply and the electrical apparatus, wherein:
   the rectifier comprises a pair of diodes, each having an anode and a cathode;
   the input terminals are coupled to respective anodes of each of the pair of diodes;
   the cathodes of the pair of diodes are coupled together and to a first input terminal of the direct current power supply;
   the switch is coupled to each of the anodes and to a second in gut tee the direct current power supply; and wherein:
   in response to energy management signals regarding the electrical apparatus provided on the power management bus, the control unit provides signals to the switch to provide changing amounts of alternating current to the rectifier, and the rectifier in response provides controlled amounts of direct current ranging from a maximum value to zero to the direct current power supply.

2. The input power unit of claim 1 wherein the electrical apparatus is configured to:
   collect usage data based on user interaction with the electrical apparatus; and
   update a usage pattern based on the collected usage data.

3. The input power unit of claim 2 wherein the electrical apparatus is configured to store the usage data in a nonvolatile memory.

4. The input power unit of claim 3 wherein the usage data comprises at least one of a group consisting of: a time that the electrical apparatus is turned on, a time that the electrical apparatus is turned off, and a time duration that a user continuously interacts with the electrical apparatus.

5. The input power unit of claim 4 wherein the electrical apparatus comprises a computing device.

6. The input power unit of claim 5 wherein the usage data comprises an operational state of the computing device before power was previously removed from the computing device, the usage data comprising at least one of a group consisting of: a software program launched during a user session before power was previously removed from the computing device, a web page accessed during the user session before power was previously removed from the computing device, and a file accessed during a user session before power was previously removed from the computing device.

7. The input power unit of claim 6 wherein, in response to increasing power supplied to the computing device during a time period of likely high power consumption, the computing device is restored to the operational state before power was previously removed from the computing device.

8. The input power unit of claim 7 wherein no power is supplied to the electrical apparatus during the time period when the electrical apparatus is likely to consume low levels of power.

9. The input power unit of claim 2 wherein:
   power supplied to the electrical apparatus by the direct current power supply is reduced by the input power control unit during a time period identified by the usage pattern when the electrical apparatus is likely to consume low levels of power; and
   power supplied to the electrical apparatus by the direct current power supply is increased by the input power control unit during a time period identified by the usage pattern when the electrical apparatus is likely to consume high levels of power.

10. An input power unit as in claim 1 wherein:
    the control unit controls a duty cycle of the switch in response to the energy management signals received from the electrical apparatus; and
    wherein the duty cycle of the switch determines the amount of power provided to the rectifier.

11. An input power unit as in claim 10 wherein:
    the electrical apparatus generates a usage pattern which identifies time periods when the electrical apparatus is likely to use differing amounts of power and provides that information to the control unit; and
    in response the control unit provides control signals to the switch to control direct current from the rectifier in accordance with likely power use of the electrical apparatus.

12. An input power unit as in claim 11 wherein the rectifier comprises a bridge rectifier.

13. An input power unit as in claim 12 wherein the switch comprises at least one of a transistor, a diode and a thyristor.

14. The input power unit of claim 13 wherein the switch comprises a pair of transistors coupled together.

15. The input power unit of claim 13 wherein the switch comprises a pair of diodes coupled together.

16. In a system having an input power unit for controlling power supplied to an electrical apparatus which is coupled to a direct current power supply, the input power unit including input terminals adapted to be connected to a source of alternating current, a switch coupled to the input terminals, a control unit connected to provide control signals to the switch, a rectifier connected to the switch, a power management bus coupled to the control unit, the direct current power supply and the electrical apparatus, in which in response to energy management signals regarding the electrical apparatus provided on the power management bus, the control unit provides signals to the switch to provide changing amounts of alternating current to the rectifier, the controlled amounts ranging from a maximum value to zero, and the rectifier in response provides controlled amounts of direct current to the direct current power supply, and wherein the rectifier comprises a pair of diodes, each having an anode and a cathode; the input terminals are coupled to respective anodes of each of the pair of diodes; the cathodes of the pair of diodes are coupled together and to a first input terminal of the direct current power supply; and the switch coupled to each of the anodes and to a second input terminal of the direct current power supple a method comprising:
    collecting usage data based on user interaction with an electrical apparatus;
    generating a usage pattern based on the collected usage data, wherein the usage pattern identifies time periods when the electrical apparatus is likely to consume high levels of power and low levels of power;
    transmitting a signal identifying at least one of: a time period identified by the usage pattern when the electrical apparatus is likely to consume low levels of power and a time period identified by the usage pattern when the electrical apparatus is likely to consume high levels of power;
    receiving reduced power at the electrical apparatus during the time period when the electrical apparatus is likely to consume low levels of power; and
    receiving increased power at the electrical apparatus during the time period when the electrical apparatus is likely to consume high levels of power.

17. The method of claim 16, further comprising:
    collecting additional usage data based on additional user interaction with the electrical apparatus; and
    updating the usage pattern based on the collected additional usage data.

18. The method of claim 16, wherein the electrical apparatus comprises a computing device, the method further comprising:
    in response to increasing power supplied to the computing device during a time period of likely high levels of power consumption, restoring the computing device to an operational state before power was previously removed from the computing device.

* * * * *